US007373793B2

(12) United States Patent
Choi (10) Patent No.: US 7,373,793 B2
(45) Date of Patent: May 20, 2008

(54) DAMPER ASSEMBLY AND WASHING MACHINE USING THE SAME

(75) Inventor: Kang Mo Choi, Masan-si (KR)

(73) Assignee: LG Electronics Inc., Seoul (KR)

( * ) Notice: Subject to any disclaimer, the term of this patent is extended or adjusted under 35 U.S.C. 154(b) by 532 days.

(21) Appl. No.: 10/921,838

(22) Filed: Aug. 20, 2004

(65) Prior Publication Data

US 2005/0183472 A1   Aug. 25, 2005

(30) Foreign Application Priority Data

Feb. 25, 2004   (KR) ...................... 10-2004-0012603

(51) Int. Cl.
  *D06F 37/22* (2006.01)
(52) U.S. Cl. .............................. 68/23.1; 68/23.4; 68/24
(58) Field of Classification Search ................. 68/23.1, 68/23.2, 23.4, 24; 403/154, 157, 161
See application file for complete search history.

(56) References Cited

U.S. PATENT DOCUMENTS

| 530,083 | A | * | 12/1894 | Bradley | ...................... | 411/552 |
| 2,297,831 | A | * | 10/1942 | Heard | ........................ | 411/318 |
| 2,947,024 | A | * | 8/1960 | Czudak, Jr. | .................. | 16/228 |
| 3,385,541 | A | * | 5/1968 | Stelwagen | .................. | 248/562 |
| 3,645,160 | A | * | 2/1972 | Artioli et al. | ............... | 411/347 |
| 3,861,267 | A | * | 1/1975 | Collister | ...................... | 411/345 |
| 3,929,370 | A | * | 12/1975 | Farrell | ........................ | 296/167 |
| 4,579,494 | A | * | 4/1986 | Bierwith | ...................... | 411/512 |
| 4,762,437 | A | * | 8/1988 | Mitomi | ........................ | 403/11 |
| 5,335,522 | A | * | 8/1994 | Stadelmann et al. | ......... | 68/23.1 |
| 5,437,515 | A | * | 8/1995 | Kuramoto et al. | .......... | 403/154 |
| 5,517,723 | A | * | 5/1996 | Sircy | ............................ | 16/228 |
| 5,613,380 | A | * | 3/1997 | Savkar | ....................... | 68/23.3 |
| 5,630,519 | A | * | 5/1997 | Burke et al. | ................. | 213/155 |
| 5,709,109 | A | * | 1/1998 | Cho | ............................ | 68/23.2 |
| 6,568,894 | B2 | * | 5/2003 | Golden et al. | .............. | 411/351 |
| 6,872,039 | B2 | * | 3/2005 | Baus et al. | .................. | 411/341 |

FOREIGN PATENT DOCUMENTS

| JP | 6-225990 | * | 8/1994 |
| JP | 2001-239089 | * | 9/2001 |

OTHER PUBLICATIONS

European Patent Office 0 315 076 Oct. 1988.*
European Patent Office 0 887 456 Dec. 1988.*

* cited by examiner

*Primary Examiner*—Frankie L. Stinson
(74) *Attorney, Agent, or Firm*—McKenna Long & Aldridge LLP (57) ABSTRACT

A damper assembly and washing machine using the same, by which a damper pin configured to facilitate assembly is provided and by which a damper pin is configured to avoid breaking, are disclosed. The damper assembly includes a base having a first connecting portion, a damper having a second connecting portion at one end and attenuating a vibration transferred to the base, and a damper pin penetrating the first and second connecting portions to secure them, the damper pin having a slip-fit connection with the first and second connecting portions.

22 Claims, 7 Drawing Sheets

DAMPER ASSEMBLY AND WASHING MACHINE USING THE SAME

This application claims the benefit of Korean Application No. P2004-012603, filed on Feb. 25, 2004, which is hereby incorporated by reference.

BACKGROUND OF THE INVENTION

1. Field of the Invention

The present invention relates to a washing machine, and more particularly, to a damper assembly and a washing machine using the same, in which a damper pin configured to facilitate assembly is provided.

2. Discussion of the Related Art

Generally, in a washing machine, a tub holds water and detergent inside and a laundry is put in a drum installed within the tub. And the drum is rotated to perform washing, rinsing, and dewatering. The washing machine is an apparatus for removing filth or dirt attached to the laundry using the detergent and mechanical energy applied thereto appropriately. Specifically, a drum, which is horizontally installed within a drum type washing machine, holds detergent, water, and laundry therein and is then rotated by a drive force of a motor to remove filth or dirt attached the laundry. Such a drum type washing machine avoids causing damage or ravel to the laundry, consumes less water, and brings about a washing effect of beating and rubbing.

Figure 1:
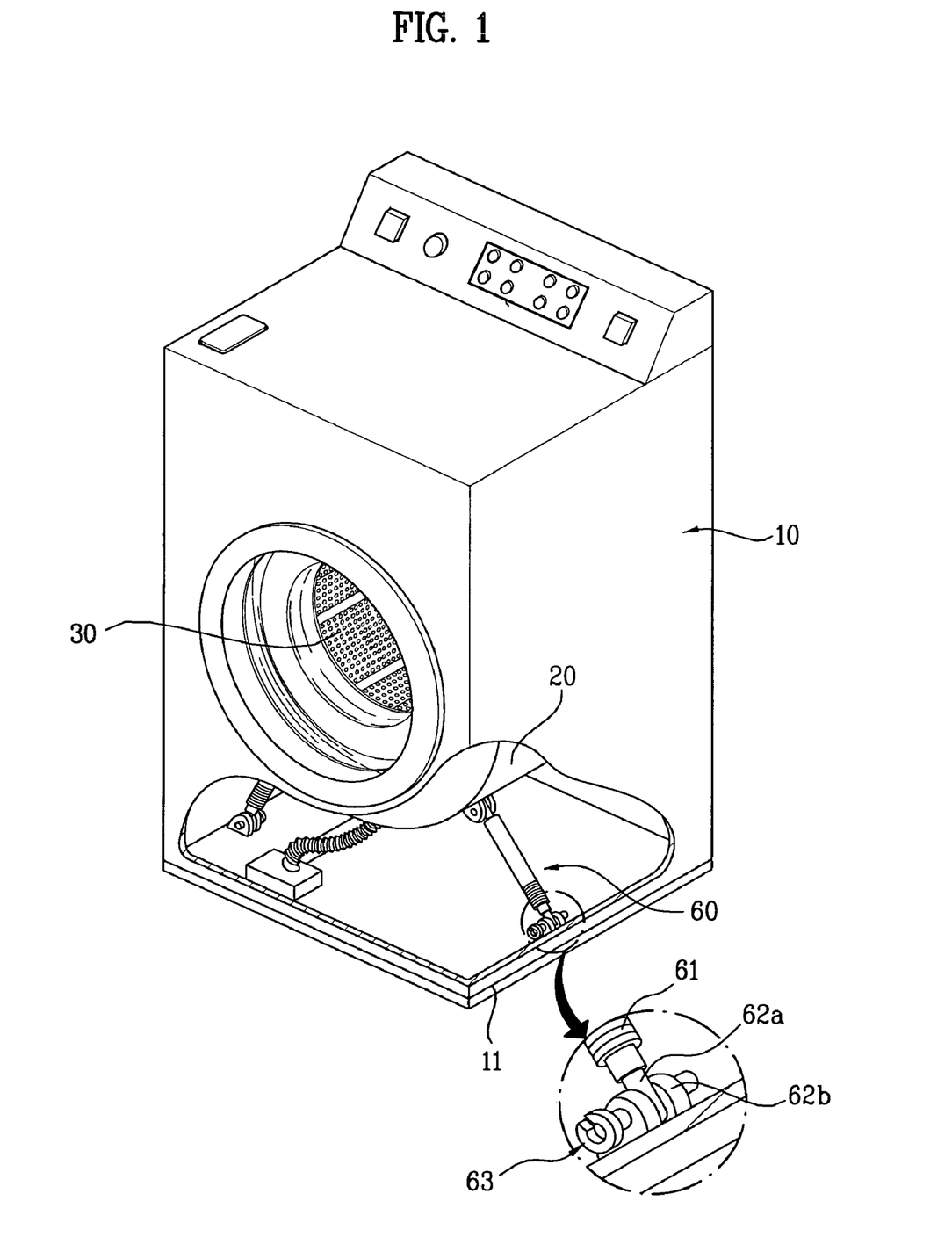
FIG. 1 is a perspective diagram of a damper assembly of a washing machine according to a related art.

Referring to FIG. 1, a general drum type washing machine consists of a cabinet 10 forming an overall exterior, a tub 20 provided within the cabinet 10 to store water therein, and a cylindrical drum 30 rotatably installed within the tub 20 to hold a laundry therein. In this case, a control panel provided with buttons and switches to input an operational condition of the washing machine and a detergent box connected to a water supply device, which supplies water to the drum, to supply a detergent together with the water are provided to the cabinet. The above-constructed washing machine according to a related art performs washing on a laundry using chemical reaction of the detergent, water current generated from a rotation of the drum, and friction thereof.

Meanwhile, a damper assembly 60 is installed between the tub 20 and a base plate 11 of the cabinet to attenuate vibration appearing on the tub while the drum rotates. The damper assembly 60 consists of a damper 61 attenuating vibration transferred to the cabinet 10 from the tub 20 and a damper connecting part 62 connecting the damper 61 between the tub 20 and the base plate 11 of the cabinet 10. The damper connecting part 62 consists of a pair of first connecting portions 62a built in one body of both ends of the damper 61, respectively, and a pair of second connecting portions 62b built in one body of the tub 20 and the base plate 11 of the cabinet to be connected to the first connecting portions 62a by damper pins 63, respectively.

The first connecting portion 62a is inserted in the second connecting portion 62b so that both sides of the first connecting portion 62a is supported by the second connecting portion 62b. And, a pair of perforated holes is formed at the first and second connecting portions 62a and 62b, respectively, so that the damper pin 63 is fitted in the perforated holes, respectively. The damper pin needs to be easily assembled and should avoid being easily broken. Hence, many efforts are made to develop a damper assembly having the damper pin that is configured to facilitate assembly and avoid being broken.

SUMMARY OF THE INVENTION

Accordingly, the present invention is directed to a damper assembly and a washing machine using the same that substantially obviate one or more of the problems due to limitations and disadvantages of the related art.

An object of the present invention, which has been devised to solve the foregoing problem, lies in providing a damper assembly and a washing machine using the same, in which a damper pin configured to facilitate assembly is provided.

Another object of the present invention, which has been devised to solve the foregoing problem, lies in providing a damper assembly and a washing machine using the same, by which a damper pin is configured to avoid being broken is provided.

Additional features and advantages of the invention will be set forth in the description which follows, and in part will be apparent to those having ordinary skill in the art upon examination of the following or may be learned from a practice of the invention. The objectives and other advantages of the invention will be realized and attained by the subject matter particularly pointed out in the specification and claims hereof as well as in the appended drawings.

To achieve these objects and other advantages in accordance with the present invention, as embodied and broadly described herein, a damper assembly includes a base having a first connecting portion, a damper having a second connecting portion at one end and attenuating a vibration transferred to the base, and a damper pin penetrating the first and second connecting portions to secure them, the damper pin having a slip-fit connection with the first and second connecting portions.

The damper pin may include a detent, wherein the detent is elastically transformed in a central axis direction of the damper pin by the damper connecting part when the damper pin penetrates through the connecting portions, and wherein the detent restores to be locked on a lateral side of the connecting portions after thoroughly penetrating (or passing through) the connecting portions. Herein, the detent may include a front portion connected in one body to a lateral outside of the damper pin, a rear portion protruding outward from the damper pin, and a tilted surface between the front and rear portions to be tilted in a length direction of the damper pin.

A cross-sectional area of the front portion of the detent vertical to the length direction of the damper pin may be smaller than that of another portion of the detent. Herein, a hole may be formed in a portion of the damper pin where the detent is connected to the lateral outside of the damper pin. The hole may have one of a circle shape and an oval shape. Also, a hollow may be formed in the damper pin, and wherein the detent is formed by cutting a lateral side of the damper pin. Herein, the hole may extend to a front end of the damper pin.

A recess may be formed in a concave shape toward a center of the front portion on at least one of both sides of the front portion of the detent. Herein, a rim of the recess may be curved. A front-to-rear length of the detent may be at least 1.5 time greater than a width of the detent.

In another aspect of the present invention, a washing machine includes a cabinet forming an exterior of the washing machine, a tub provided within the cabinet to accommodate water therein, a drum rotatably provided within the tub to perform washing on a laundry therein, and a damper assembly provided between the tub and the cabinet to attenuate a vibration, wherein the damper assembly may include a damper attenuating a vibration transferred to the cabinet, wherein the cabinet has a first connecting portion and the damper has a second connecting portion at one end, and a damper pin penetrating the first and second connecting portions to secure them, the damper pin having a slip-fit connection with the first and second connecting portions.

It is to be understood that both the foregoing explanation and the following detailed description of the present invention are exemplary and illustrative and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Throughout the drawings, like elements are indicated using the same or similar reference designations where possible.

Figure 2:
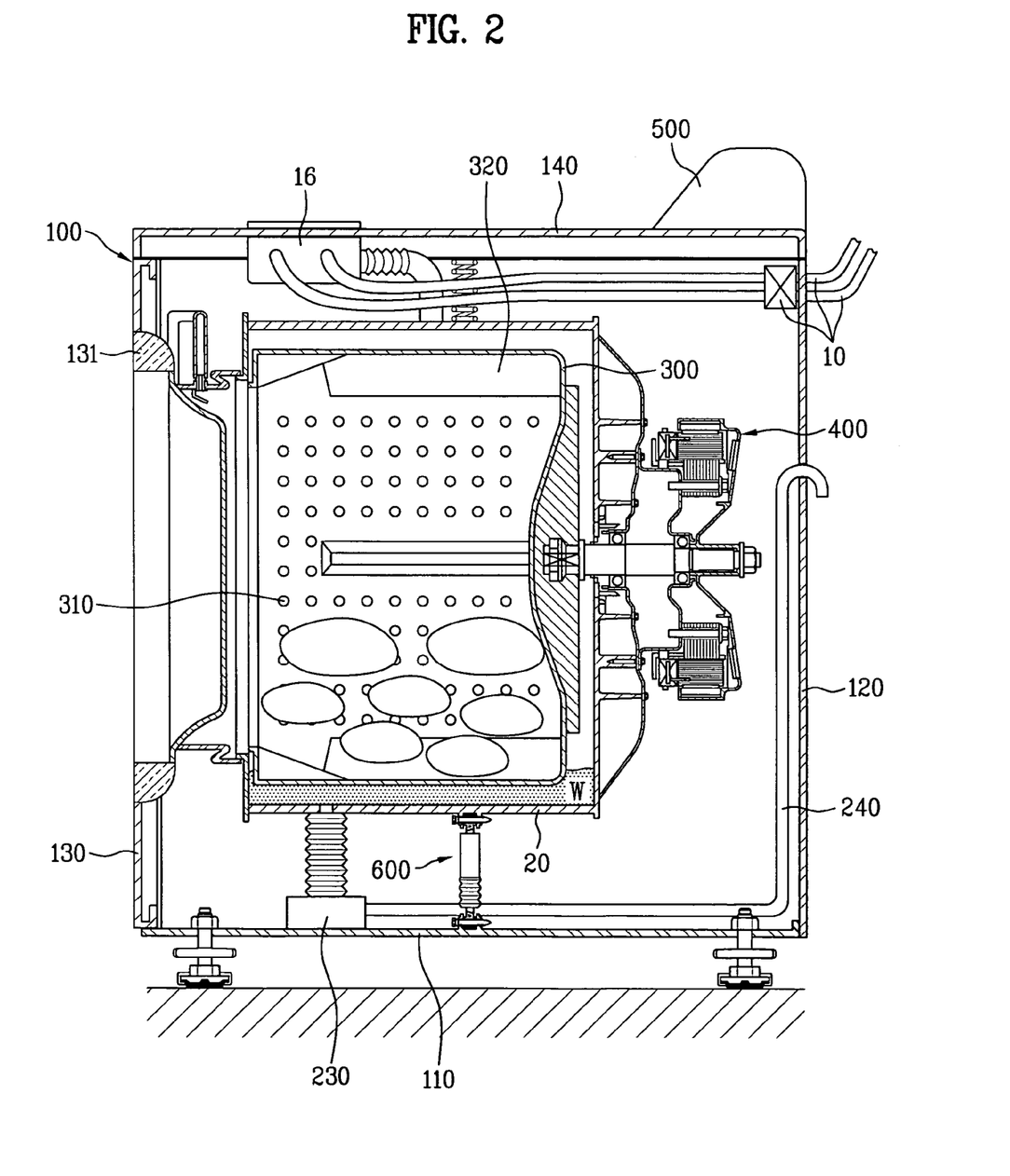
FIG. 2 is a cross-sectional diagram of a washing machine provided with a damper assembly according to the present invention.
Figure 3:
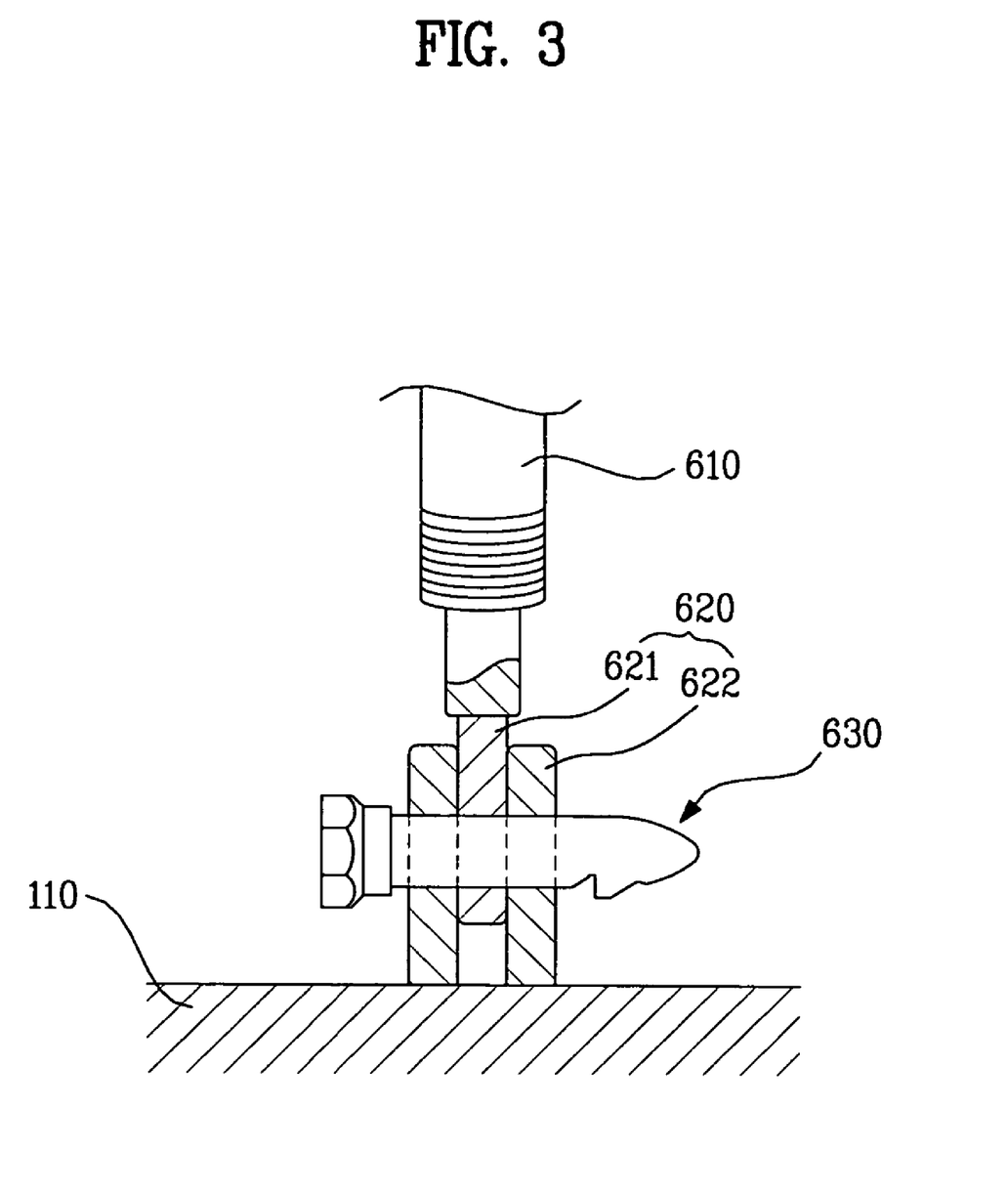
FIG. 3 is a cross-sectional diagram of a damper assembly according to one embodiment of the present invention.

FIG. 2 is a cross-sectional diagram of a washing machine provided with a damper assembly according to the present invention, and FIG. 3 is a cross-sectional diagram of a damper assembly according to one embodiment of the present invention. Referring to FIGS. 2 and 3, a drum type washing machine according to one embodiment of the present invention includes a cabinet 100 forming an exterior, a tub 200 provided within the cabinet 100, a drum 300 rotatably provided within the tub 200, and a rotating means 400 for rotating the drum 300. The cabinet 100 includes a base plate 110 provided to a bottom side, a pair of side plates (not shown) provided to both sides of the base plate 110, respectively, a rear plate 120 provided to rear sides of the base plate 110 and side plates, a front plate 130 provided to front sides of the base plate 110 and side plates, and a top plate 140 provided to topsides of the rear plate 120, side plates and front plate 130.

An opening (not shown) is formed at a center of the front plate 130 so that a laundry is put/pulled in/out via the opening. And, a door 131 for preventing the laundry from escaping via the opening is provided to the front plate 130 to open/close the opening. Moreover, a control panel 500 for controlling an operation of the drum type washing machine is installed on a topside of the front plate 130. The tub 200 is supported by an elastic means 220 such as a spring and a damper assembly 600 to attenuate vibration generated from operation of the drum type washing machine. And, a tub entrance (not shown) is formed at a front end of the tub 200 to confront the opening of the cabinet 100. The drum 300 has a cylindrical shape, and a multitude of perforated holes 310 are formed thereon to let water pass through. At least one or more lifters 320 are provided to an inner wall of the drum 300 to lift a laundry up to a predetermined height. Once the drum 300 is rotated, the laundry held within the drum 300 is repeatedly lifted upward to fall by gravity to perform washing on the laundry.

A circular drum entrance (not shown) confronting the tub entrance is formed at a front end of the drum 300. Hence, the drum entrance, the tub entrance, and the opening of the cabinet 100 construct a laundry entrance/exit part via which the laundry goes in or comes out of the drum 300. The rotating means 400 can include an induction motor or BLDC motor provided in rear of the tub 200. A rotational shaft of the motor is connected to a rear end center of the drum 300 to perform forward or reverse rotation of the drum 300. And, a drain pump 230 and drain hose 240 for discharging water are installed under the tub 200. Moreover, an inlet device 250 for supplying water to the tub 200 and a detergent box 260 connected to the inlet device 250 to supply a detergent together with the water are provided over the tub 200.

A damper assembly provided to a washing machine according to the present invention is explained by referring to FIG. 3 as follows. A damper assembly 600 includes a damper 610 attenuating vibration transferred from the tub 200 and a damper connecting part 620. And, the damper connecting part 620 includes a pair of first connecting portions 621 built in one body of both ends of the damper 610, respectively, a pair of second connecting portions 622 built in one body of the tub 200 and the base plate 110 of the cabinet to be connected to the first connecting portions, respectively, and a pair of damper pins 630 each of which penetrates both of the corresponding first and second connecting portions 621 and 622 to prevent separation. In this case, pin holes (not shown) are formed in the first and second connecting portions 621 and 622, respectively, so that the damper pin 630 can be inserted in the corresponding pin holes. And, the first connecting portion 621 is received in the corresponding second connecting portion 622 to be coupled.

Figure 4A:
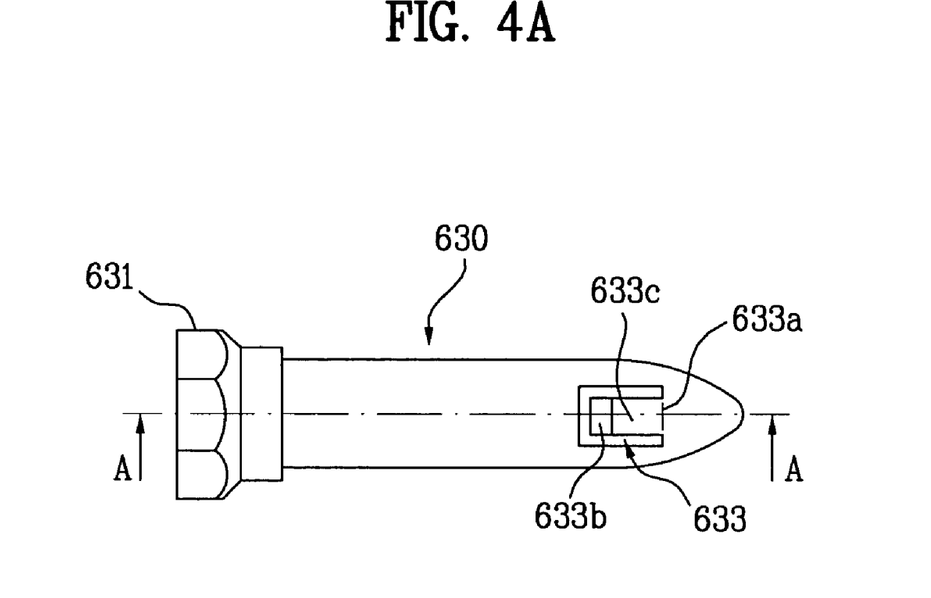
FIG. 4A is a layout of a damper pin provided to a damper assembly according to a first embodiment of the present invention.

Damper pins provided to the damper assembly according to various embodiments of the present invention are explained by referring to FIGS. 4A to 7 as follows. FIG. 4A is a layout of a damper pin provided to the damper assembly 600 according to a first embodiment of the present invention, and FIG. 4B is a cross-sectional diagram of the damper pin taken along line A-A of FIG. 4A.

Figure 4B:
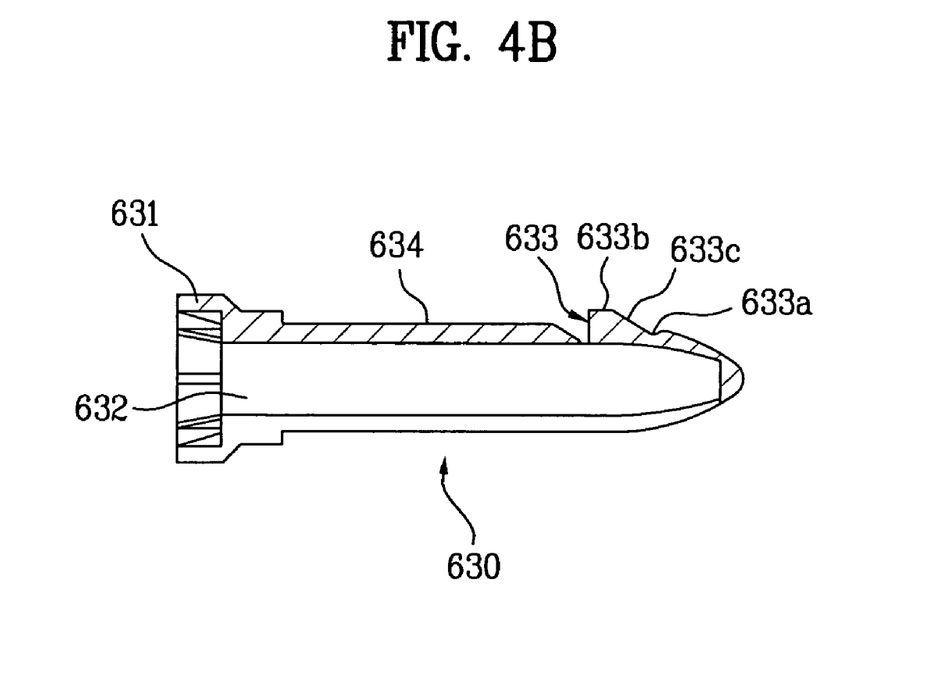
FIG. 4B is a cross-sectional diagram of the damper pin taken along line A-A of FIG. 4A.

Referring to FIGS. 4A and 4B, a pin head 631 is formed at a rear part of the damper pin 630 to have an outside diameter greater than each inside diameter of the pin holes. Preferably, a front part of the damper pin 630 gradually decreases in diameter toward its front end to facilitate the damper pin 630 to be inserted in the pin holes of the damper connecting part 620. A hollow 632 is formed in the damper pin 630 and one side of the damper pin 630 is cut in a length direction of the damper pin 630. Hence, the damper pin 630 becomes elastic. Specifically, the damper pin 630 includes a detent 633. And, the detent 633 includes a front portion 633a connected to an outer circumference 634 of the damper pin 630 in one body and a rear portion 633b protruding from the damper pin 630. Hence, a tilted surface 633c is formed between the front and rear portions 633a and 633b of the detent 633 in the length direction of the damper pin 630.

When the damper pin 630 is being passed through the damper connecting part 620, the detent 633 is pressed by an inner wall of the corresponding pin hole of the damper connecting part 620 to be elastically transformed in a central axis direction of the damper pin 630 centering on the front portion 633a of the detent 633. The detent 633 is restored after having passed a predetermined distance to be caught on the damper connecting part 620, and more particularly, on a lateral outside of the second connecting portion 622, thereby preventing the damper pin 630 from coming out. Preferably, the detent 633 is formed by cutting a lateral side of the damper pin 630 to provide a 'п' shape. Preferably, a length between front and rear ends of the detent 633 is formed at least 1.5 times greater than a length between both lateral sides of the detent 633 to minimize a bending force applied to the front portion 633a of the detent 633 by the transformation generated when the damper pin 630 is being passed through the corresponding pin holes.

Figure 5A:
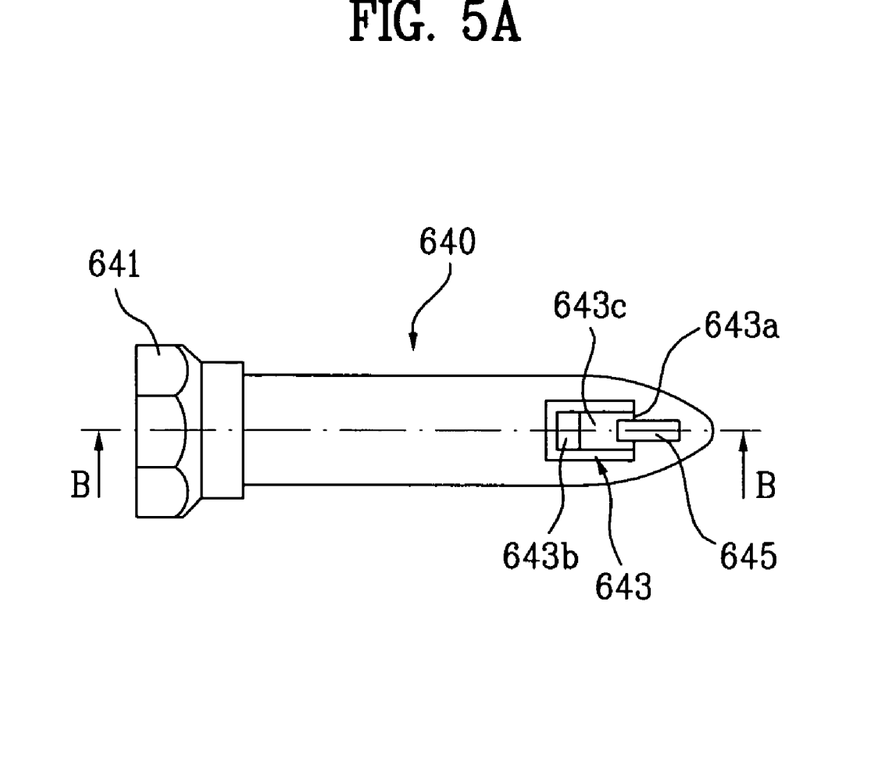
FIG. 5A is a layout of a damper pin provided to a damper assembly according to a second embodiment of the present invention.
Figure 5B:
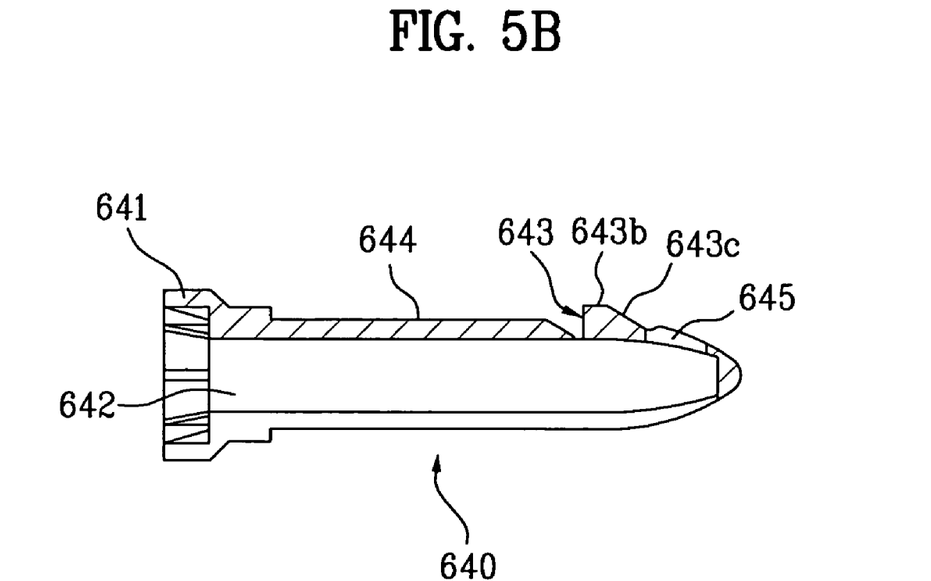
FIG. 5B is a cross-sectional diagram of the damper pin taken along line line B-B of FIG. 5A.

FIG. 5A is a layout of a damper pin 640 provided to a damper assembly according to a second embodiment of the present invention, and FIG. 5B is a cross-sectional diagram of the damper pin taken along line B-B of FIG. 5A. Referring to FIGS. 5A and 5B, like the first embodiment of the present invention, a pin head 641 is formed at a rear part of the damper pin 640 to have an outside diameter greater than each inside diameter of the pin holes. A front part of the damper pin 640 gradually decreases in diameter toward its front end to facilitate the damper pin 640 to be inserted in the pin holes of the damper connecting part 620. A hollow 642 is formed in the damper pin 640 and one side of the damper pin 640 is cut in a length direction of the damper pin 640. Hence, the damper pin 640 becomes elastic.

And, the damper pin 640 includes a detent 643 formed by cutting a lateral side of the damper pin 640 to provide a 'п' shape. Specifically, the detent 643 includes a front portion 643a connected to an outer circumference 644 of the damper pin 640 in one body and a rear portion 643b protruding from the damper pin 640. Hence, a tilted surface 643c is formed between the front and rear portions 643a and 643b of the detent 643 in the length direction of the damper pin 640.

In the second embodiment of the present invention, a cross-sectional area of the front portion 643a of the detent 643 in a vertical direction to the length direction of the damper pin 640 is formed smaller than that of the rest portion of the detent 643 except the front portion 643a to enhance flexibility of the detent 643. For this, a hole 645 is formed in a portion where the detent 643 is connected to the lateral side of the damper pin 630. The hole 645, as shown in FIG. 5A, has a square shape. Yet, a shape of the hole 645 can be variously modified into circle, oval, and the like. And, a width of the hole 645 is about a quarter (¼) to a half (½) of the width of the front portion 643a of the detent 643. By the above configuration, the damper pin 640 enables to be smoothly passed through the pin holes of the damper connecting part 620 and the elasticity of the detent 643 is enhanced to prevent the breakage thereof.

Figure 6A:
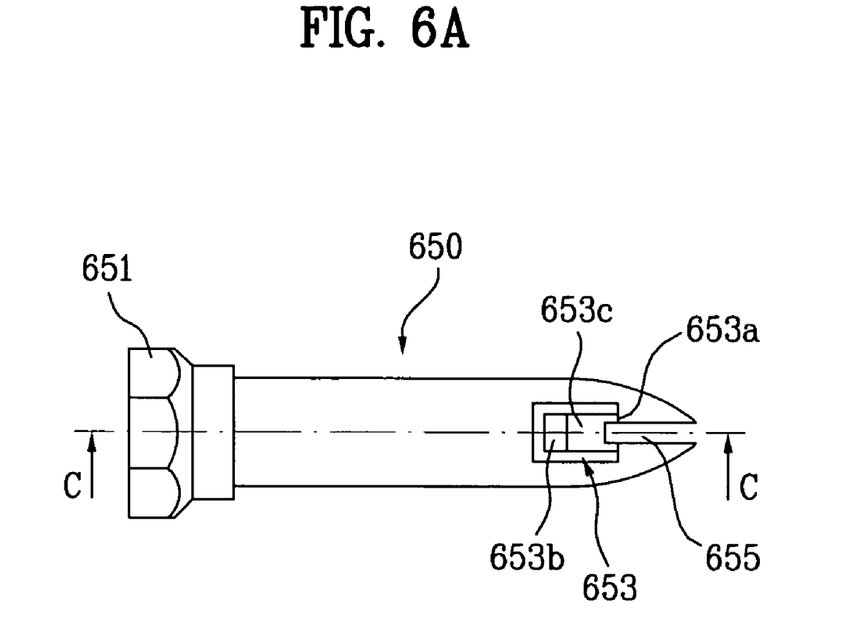
FIG. 6A is a layout of a damper pin provided to a damper assembly according to a third embodiment of the present invention.
Figure 6B:
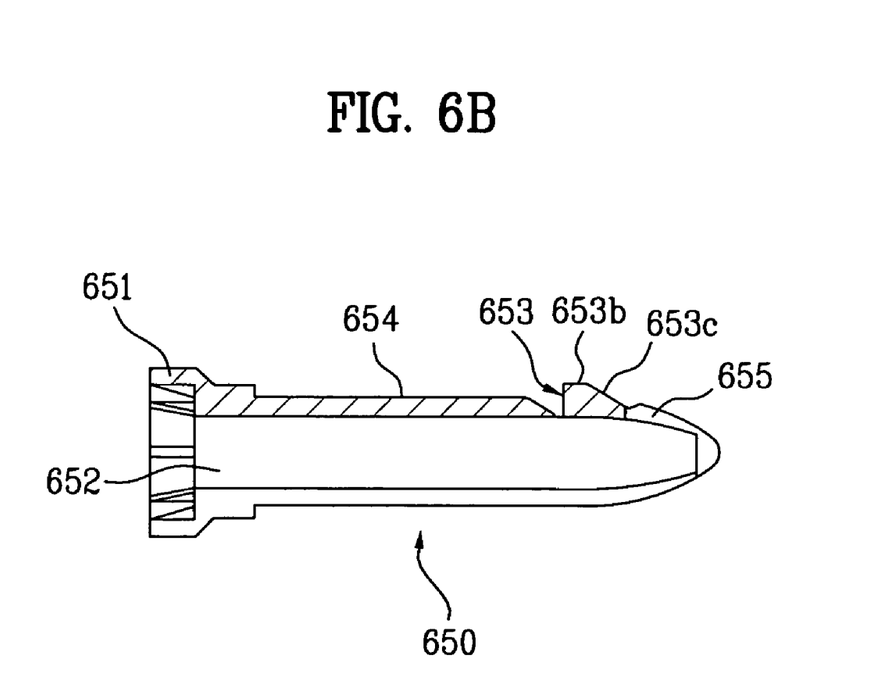
FIG. 6B is a cross-sectional diagram of the damper pin taken along line C-C of FIG. 6A.

FIG. 6A is a layout of a damper pin 650 provided to a damper assembly according to a third embodiment of the present invention, and FIG. 6B is a cross-sectional diagram of the damper pin taken along line C-C of FIG. 6A. Referring to FIGS. 6A and 6B, like the second embodiment of the present invention, a pin head 651 is formed at a rear part of the damper pin 650 to have an outside diameter greater than each inside diameter of the pin holes. A front part of the damper pin 650 gradually decreases in diameter toward its front end to facilitate the damper pin 650 to be inserted in the pin holes of the damper connecting part 620. A hollow 652 is formed in the damper pin 650 and one side of the damper pin 650 is cut in a length direction of the damper pin 650. Hence, the damper pin 650 becomes elastic.

And, the damper pin 650 includes a detent 653 formed by cutting a lateral side of the damper pin 650 to provide a 'п' shape. Specifically, the detent 653 includes a front portion 653a connected to an outer circumference 654 of the damper pin 650 in one body and a rear portion 653b protruding from the damper pin 650. Hence, a tilted surface 653c is formed between the front and rear portions 653a and 653b of the detent 653 in the length direction of the damper pin 650. A hole 655 is formed in a portion where the detent 653 is connected to the lateral side of the damper pin 650. The hole 655 extends to the front end of the damper pin 650 to enhance elasticity of the detent 653 and the damper pin 650 and to facilitate to manufacture the damper pin 650.

Figure 7:
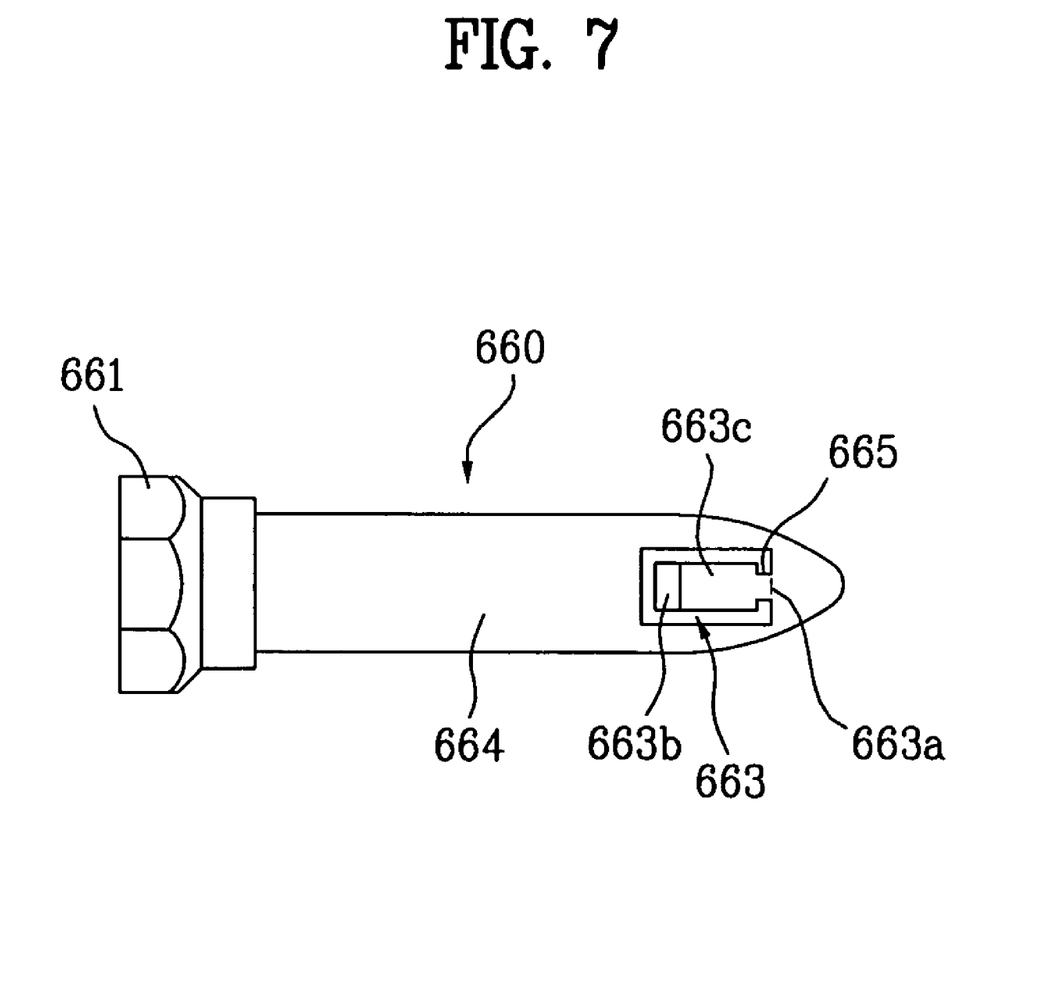
FIG. 7 is a layout of a damper pin provided to a damper assembly according to a fourth embodiment of the present invention.

FIG. 7 is a layout of a damper pin 660 provided to a damper assembly according to a fourth embodiment of the present invention. Referring to FIG. 7, like the second embodiment of the present invention, a pin head 661 is formed at a rear part of the damper pin 660 to have an outside diameter greater than each inside diameter of the pin holes. A front part of the damper pin 660 gradually decreases in diameter toward its front end to facilitate the damper pin 660 to be inserted in the pin holes of the damper connecting part 620. A hollow (not shown) is formed in the damper pin 660 and one side of the damper pin 660 is cut in a length direction of the damper pin 660. Hence, the damper pin 660 becomes elastic.

And, the damper pin 660 includes a detent 663 formed by cutting a lateral side of the damper pin 660 to provide a 'п' shape. Specifically, the detent 663 includes a front portion 663a connected to an outer circumference 664 of the damper pin 660 in one body and a rear portion 663b protruding from the damper pin 660. Hence, a tilted surface 663c is formed between the front and rear portions 663a and 663b of the detent 663 in the length direction of the damper pin 660. A recess 665 is formed in at least one of both sides of the front portion 663a of the detent 663 to be concave toward a center of the front portion 663a. In doing so, a rim of the recess 665 can be curved.

Meanwhile, as mentioned in the foregoing description of the first embodiment of the present invention, it is apparent that the length between front and rear ends of the detent of the second to fourth embodiments of the present invention can be formed at least 1.5 times greater than a length between both lateral sides of the detent.

An assembling process of the above-constructed damper assembly 600 according to the present invention is explained as follows. First of all, a pair of the first connecting portions 621 built in one body of both of the ends of the damper 610 are inserted in a pair of the second connecting portions 622 built in one body of the cabinet 100 and the tub 200 to be coupled thereto, respectively.

Subsequently, the damper pin 630, 640, 650 or 660 is inserted in the pin holes of the damper connecting part 620. When the damper pin 630, 640, 650 or 660 is being passed through the damper connecting part 620, the detent 633, 643, 653 or 663 is pressed by an inner wall of the corresponding pin hole of the damper connecting part 620 to be elastically transformed in a central axis direction of the corresponding damper pin centering on the front portion 633a, 643a, 653a or 663a of the corresponding detent. The corresponding detent 633, 643, 653 or 663 is restored after having passed a predetermined distance to be caught on the damper connecting part 620, and more particularly, on a lateral outside of the second connecting portion 622, thereby preventing the corresponding damper pin 630, 640, 650 or 660 from coming out of the damper connecting part 620.

Accordingly, the present invention provides the following advantages or effects. First of all, the detent preventing the separation of the damper pin is provided to the lateral side of the damper pin, whereby the damper assembly is facilitated to be assembled. Secondly, the length of the detent of the damper pin is formed at least 1.5 times longer than the width of the detent, whereby elasticity is enhanced. Moreover, the damper pin is prevented from being broken when assembled to the damper connecting part.

Thirdly, the cross-sectional area of the front portion of the detent in a vertical direction to the length direction of the damper pin is formed smaller than that of the rest portion of the detent except the front portion to enhance elasticity or flexibility of the detent. Moreover, the damper pin is prevented from being broken when assembled to the damper connecting part. Finally, the hole extending to the front end of the damper pin from the front portion of the detent is provided to the damper pin, thereby enhancing the overall elasticity of the damper pin and facilitating to manufacture the damper pin.

It will be apparent to those skilled in the art that various modifications and variations can be made in the present invention without departing from the spirit or scope of the invention. Thus, it is intended that the present invention cover such modifications and variations, provided they come within the scope of the appended claims and their equivalents.

What is claimed is:

1. A damper assembly, comprising:
   a base having a first connecting portion;
   a damper having a second connecting portion at one end and attenuating a vibration transferred to the base;
   a damper pin penetrating the first and second connecting portions to secure them, the damper pin having a slip-fit connection with the first and second connecting portions;
   a detent including a front portion and a rear portion, wherein the front portion is connected in one body to a lateral outside of the damper pin, and wherein the rear portion protrudes outward from the damper pin; and
   a hole formed on the damper pin, wherein the hole intrudes into at least the front portion of the detent and does not intrude into the rear portion of the detent.

2. The damper assembly of claim 1, wherein the detent is elastically transformed in a central axis direction of the damper pin by the damper connecting part when the damper pin penetrates through the connecting portions, and wherein the detent restores to be locked on a lateral side of the connecting portions after thoroughly penetrating (or passing through) the connecting portions.

3. The damper assembly of claim 2 wherein the detent comprises:
   a tilted surface between the front and rear portions to be tilted in a length direction of the damper pin.

4. The damper assembly of claim 3, wherein a cross-sectional area of the front portion of the detent vertical to the length direction of the damper pin is smaller than that of another portion of the detent.

5. The damper assembly of claim 4, wherein the hole is formed in a portion of the damper pin where the detent is connected to the lateral outside of the damper pin.

6. The damper assembly of claim 5, wherein the hole has one of a circle shape and an oval shape.

7. The damper assembly of claim 5, wherein a hollow is formed in the damper pin, and wherein the detent is formed by cutting a lateral side of the damper pin.

8. The damper assembly of claim 7, wherein the hole extends to a front end of the damper pin.

9. The damper assembly of claim 4, wherein a recess is formed in a concave shape toward a center of the front portion on at least one of both sides of the front portion of the detent.

10. The damper assembly of claim 9, wherein a rim of the recess is curved.

11. The damper assembly of claim 1, wherein a front-to-rear length of the detent is at least 1.5 time greater than a width of the detent.

12. A washing machine, comprising:
    a cabinet forming an exterior of the washing machine;
    a tub provided within the cabinet to accommodate water therein;
    a drum rotatably provided within the tub to perform washing on a laundry therein; and
    a damper assembly provided between the tub and the cabinet to attenuate a vibration, wherein the damper assembly comprises:
    a damper attenuating a vibration transferred to the cabinet, wherein the cabinet has a first connecting portion and the damper has a second connecting portion at one end;
    a damper pin penetrating the first and second connecting portions to secure them, the damper pin having a slip-fit connection with the first and second connecting portions; and
    a detent including a front portion and a rear portion, wherein the front portion is connected in one body to a lateral outside of the damper pin, and wherein the rear portion protrudes outward from the damper pin; and
    a hole formed on the damper pin, wherein the hole intrudes into at least the front portion of the detent and does not intrude into the rear portion of the detent.

13. The washing machine of claim 12, wherein the detent is elastically transformed in a central axis direction of the damper pin by the damper connecting part when the damper pin penetrates through the connecting portions, and the detent restores to be locked on a lateral side of the connecting portions after thoroughly penetrating through the connecting portions.

14. The washing machine according to claim 13, wherein the detent comprises:
    a tilted surface between the front and rear portions to be tilted in a length direction of the damper pin.

15. The washing machine of claim 14, wherein a cross-sectional area of the front portion of the detent vertical to the length direction of the damper pin is smaller than that of another portion of the detent.

16. The washing machine of claim 15, wherein the hole is formed in a portion of the damper pin where the detent is connected to the lateral outside of the damper pin.

17. The washing machine of claim 16, wherein the hole has one of a circle shape and an oval shape.

18. The washing machine of claim 16, wherein a hollow is formed in the damper pin, and wherein the detent is formed by cutting a lateral side of the damper pin.

19. The washing machine of claim 18, wherein the hole extends to a front end of the damper pin.

20. The washing machine of claim 15, wherein a recess is formed in a concave shape toward a center of the front portion on at least one of both sides of the front portion of the detent.

21. The washing machine of claim 20, wherein a rim of the recess is curved.

22. The washing machine of claim 12, wherein a front-to-rear length of the detent is at least 1.5 time greater than a width of the detent.

* * * * *